(No Model.) 6 Sheets—Sheet 1.

J. H. COLLINS, Jr. & I. N. KNAPP.
R. S. COLLINS, Administratrix, and W. J. COLLINS, Administrator, of J. H COLLINS, Jr., Dec'd.
GAS PRODUCING APPARATUS.

No. 480,249. Patented Aug. 9, 1892.

Fig.1.

WITNESSES:
Joshua Matlack Jr.
Wm R. Webster

INVENTORS
Joseph H. Collins Jr
Isaac N. Knapp
by their attorney
Francis T. Chambers

(No Model.) 6 Sheets—Sheet 2.

J. H. COLLINS, Jr. & I. N. KNAPP.
R. S. COLLINS, Administratrix, and W. J. COLLINS, Administrator, of J. H COLLINS, Jr., Dec'd.
GAS PRODUCING APPARATUS.

No. 480,249. Patented Aug. 9, 1892.

WITNESSES:
INVENTORS (No Model.) 6 Sheets—Sheet 4.
J. H. COLLINS, Jr. & I. N. KNAPP.
R. S. COLLINS, Administratrix, and W. J. COLLINS, Administrator, of J. H. COLLINS, Jr., Dec'd.
GAS PRODUCING APPARATUS.
No. 480,249. Patented Aug. 9, 1892.

WITNESSES: INVENTORS (No Model.) 6 Sheets—Sheet 6.
J. H. COLLINS, Jr. & I. N. KNAPP.
R. S. COLLINS, Administratrix, and W. J. COLLINS, Administrator, of J. H COLLINS, Jr., Dec'd.
GAS PRODUCING APPARATUS.

No. 480,249. Patented Aug. 9, 1892.

WITNESSES: INVENTORS

UNITED STATES PATENT OFFICE.

JOSEPH H. COLLINS, JR., OF PHILADELPHIA, PENNSYLVANIA, AND ISAAC N. KNAPP, OF PATERSON, NEW JERSEY; REBECCA S. COLLINS AND WILLIAM J. COLLINS, ADMINISTRATORS OF SAID JOSEPH H. COLLINS, JR., DECEASED, AND SAID KNAPP ASSIGNORS, BY MESNE ASSIGNMENTS, TO THE UNITED GAS IMPROVEMENT COMPANY, OF PHILADELPHIA, PENNSYLVANIA.

GAS-PRODUCING APPARATUS.

SPECIFICATION forming part of Letters Patent No. 480,249, dated August 9, 1892.

Application filed June 26, 1888. Serial No. 278,277. (No model.)

*To all whom it may concern:*

Be it known that we, JOSEPH H. COLLINS, Jr., of the city and county of Philadelphia, State of Pennsylvania, and ISAAC N. KNAPP, of Paterson, county of Passaic, State of New Jersey, have invented a new and useful Improved Gas-Producing Apparatus, of which the following is a true and exact description, reference being had to the accompanying drawings, which form a part of this specification.

Our invention relates to the construction of apparatus for the manufacture of gas; and the object which we have in view is to provide an apparatus in which a continuous production of gas can be obtained by the distillation of coal and the combination of the highly-heated coke with the elements of water, so as to form water-gas, both the coal-gas and water-gas being produced in the same retorts, and provision being preferably made for the introduction of air into said retorts, so that Siemens gas can also be produced therein and mixed with the other gases, if desired.

Our apparatus as a whole has been carefully designed with a view to rapidity of action and economy of fuel, and the various features of invention contained therein will be fully described, and clearly pointed out in the claims.

The process of manufacturing gas as carried on in our improved apparatus is, we believe, also new with us, and it forms the subject-matter of another application for a patent of even date herewith, Serial No. 278,278.

Reference is now had to the drawings which illustrate our invention, and in which—

Fig. 3, a sectional elevation on the line 1 1 of Fig. 7.

A indicates the structure containing the gas-retorts.

B is the structure containing the regenerators.

C is an exhaust-fan.

D is a producer, which may be of any ordinary construction, though we prefer to construct it in the way shown and described in our pending application, filed May 5, 1888, and serially numbered 272,954.

E is a conduit or pipe leading from the producer D to a four-way cock F.

$E'$ and $E^2$ are conduits leading from opposite sides of the four-way cock F, and $E^3$ a conduit leading from the side of cock F opposite to that at which the pipe E connects with it to the exhaust-fan C. Another pipe $G^3$ also leads to the exhaust-fan C from a four-way cock $F'$.

$G'$ and $G^2$ are conduits, also connecting with the cock $F'$ on opposite sides thereof, the fourth passage (marked $G^4$) leading to the open air.

Figure 4:
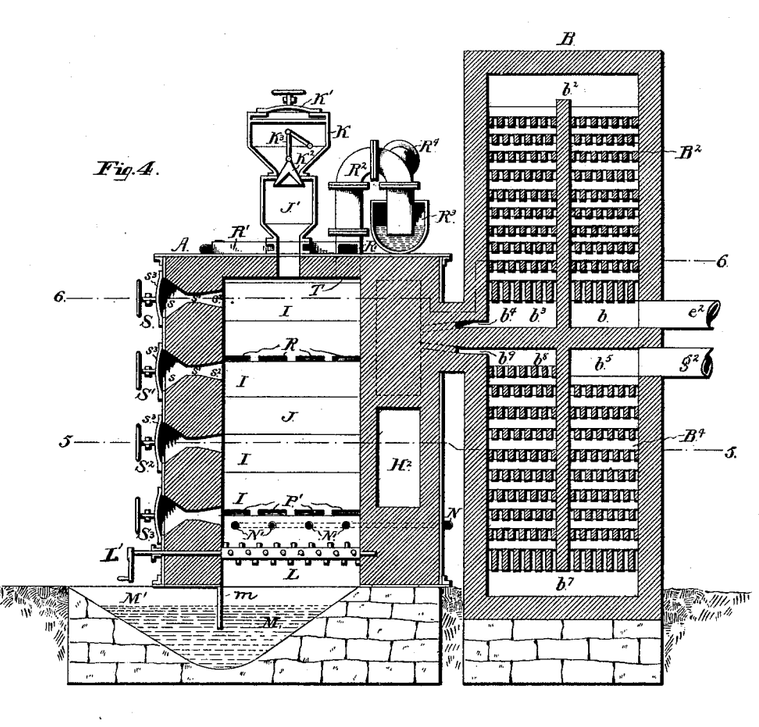
Fig. 4, a sectional elevation on the line 2 2 of Fig. 7.
Figure 5:
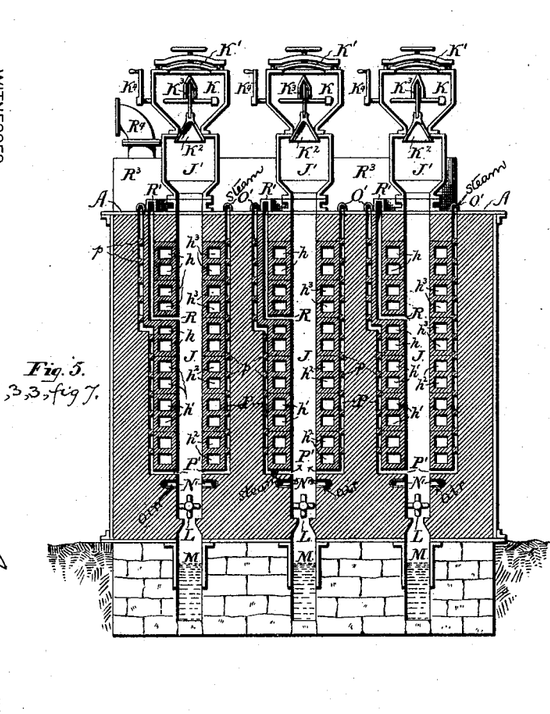
Fig. 5, a sectional elevation on the line 3 3 of Fig. 7.
Figure 6:
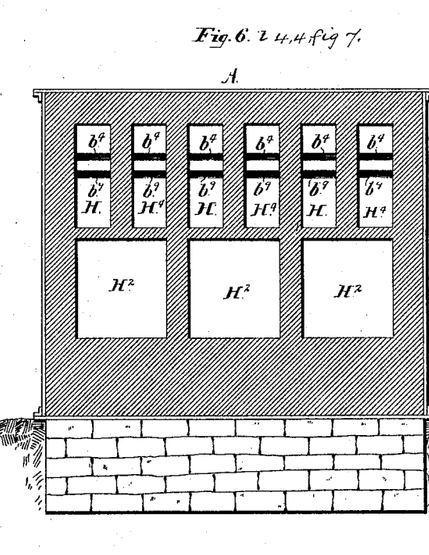
Fig. 6, a sectional elevation on the line 4 4 of Fig. 7.
Figure 7:
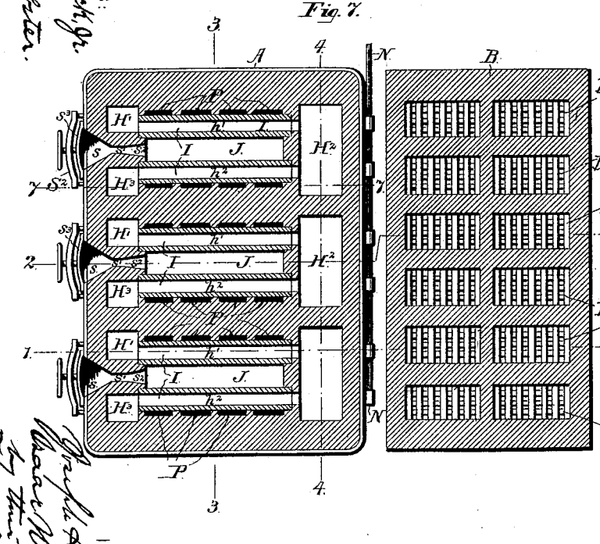
Fig. 7, a sectional plan on the line 5 5 of Fig. 4.
Figure 8:
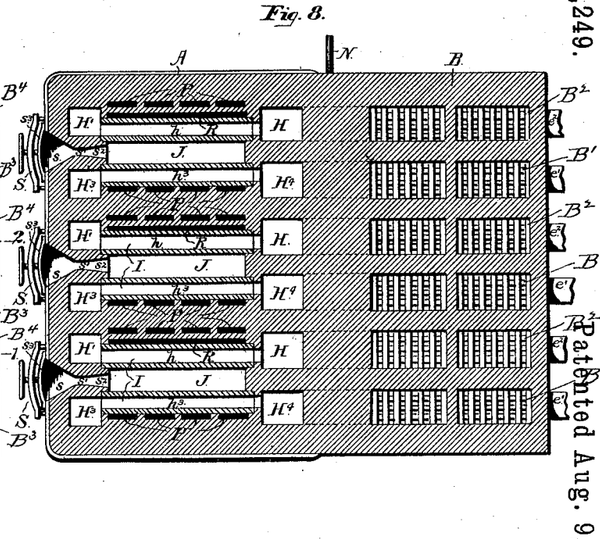
Fig. 8, a sectional plan on the line 6 6 of Fig. 4, and Fig. 9 a sectional plan on the line 7 7 of Fig. 7.

From the pipe $E'$ pipes $e'\ e'\ e'$ lead to regenerative passages, (marked $B'$,) and from the pipe $E^2$ similar pipes $e^2\ e^2\ e^2$ lead to adjacent regenerative passages, (marked $B^2$.) So, also, from the pipe $G'$ small pipes $g'\ g'\ g'$ lead to regenerative passages marked $B^3$ and situated in the structure B beneath the regenerative passages marked $B'$, while a similar set of pipes $g^2\ g^2\ g^2$ lead from the pipe $G^2$ to the regenerative passages $B^4$, lying beneath passages $B^2$. The regenerative passages $B'$ and $B^2$, lying in the upper part of the structure B, and $B^3$ and $B^4$, lying in the lower part of the same structure, are all practically the same in construction. Thus, with respect to both the passages $B'$ and $B^2$, the pipes $e'$ and $e^2$ lead into chambers $b$. Thence the passage leads upward through a mass of fire-brick to a connecting-chamber $b^2$, and then on the other side of the partition $b'$ to a chamber $b^3$, from which a passage $b^4$ leads from passages $B^2$ to a chamber H in the structure A, while from passages B' a similar passage leads to the chambers H⁴. As to the passages B³ and B⁴, the pipes $g'$ and $g^2$ lead into chamber $b^5$, thence through a mass of fire-brick on one side of partition $b^6$ to a connecting-passage $b^7$, and thence on the other side of the partition $b^6$ through another mass of fire-brick to the chambers $b^8$, from which a passage $b^9$ leads from passages B⁴ to chamber H, while from passages B³ a similar passage to $b^9$ leads to chambers H⁴. From the combustion-chamber H passages $h\,h$, &c., formed in the tiles I, lead to a triangularly-shaped chamber H'. Similar flues $h'$, lying in the same vertical plane with the flues $h$ and like them formed in tiles I, lead to a chamber H², lying beneath chambers H and H⁴. From chambers H² the passage is continued through flue $h^2$ to a chamber H³, similar in shape to the chamber H' and lying in the same plane with it, and from the chamber H³ flues $h^3$ lead to chambers H⁴, lying alongside of the chambers H. The hollow tiles I, in which are formed the flues $h, h', h^2$, and $h^3$, are laid upon each other in vertical rows, so as to form the retort-chambers J J J, which, as will be at once seen, are entirely enveloped in the flue system already described. These retort-chambers J are of course vertical, and their sides should be about one foot apart. At the top of each retort a hopper J' is secured, at the top of which is attached a closed box K, having a removable lid K', arranged so that it can be tightly fastened upon it, and a valve K², by which the passage between K and J' can be opened or closed at will.

K³ indicates a link-motion for actuating the valve K², said link-motion being operated by means of the crank K⁴. By means of this device, which is not new with us, coal can be introduced into the retorts J without admitting any air therewith or permitting the escape of any gas therefrom, the coal being placed first in the chamber K, the lid K' of which is then fastened down, and the valve K² then opened, permitting the coal to fall into the retorts J.

Near the bottom of the retorts J we place grate-bars L, preferably of the rotating kind, (shown in the drawings,) and which are operated by means of the handle L'. Below the grate-bars L we arrange an ash-pit, from which the ashes can be withdrawn from time to time without admitting air to the retort-chambers J. Any convenient plan may be used for this purpose; but we believe the device of a water-bottom M M' will be found satisfactory and efficient, furnishing a secure seal, while permitting the ashes to be withdrawn from beneath the partition $m$ at will.

N is an air-pipe, from which branches lead through the structure A and are provided with nozzles N', leading into chambers J a little above the grate L. A blast of air can be forced into the retort-chambers through these pipes and nozzles, if it is desired.

O is a steam-pipe, from which branches O', lying along the top of structure A, connect with flues P P P P, &c. These flues P run downward alongside of the flue-tiles I to near the bottom of the retort-chambers, which they enter at the point marked P'. Baffle-tiles $p$ are preferably secured in the flues P, so that the steam will be forced to take a tortuous course in contact with the hot flue-tiles I before passing into the retort-chambers J. An escape-passage for the gases generated in the retort-chambers J may be formed at their top, as indicated by the dotted line at the point T in Fig. 4. We prefer, however, to draw the gases from the retorts at a point about two feet below the level at which the fuel should be maintained therein. Such an escape-passage is indicated by the passages lettered R, and as it is desirable that the gases should be highly heated on issuing from the retorts we form the passages R so that they will run upward in contact with the flue-tiles I, the steam-passages P being brought up outside the passages R when they come together. From the passages R the gases escape into a box R', and thence to a collecting-main, the device shown being a U-pipe R², leading into a hydraulic main R³, from which a pipe R⁴ connects with the storage-tanks.

In order to enable the furnace-men to get at the interior of the retort-chambers with pokers, so as to keep the coal and coke properly broken up and prevented from scaffolding in the retorts, we provide in one end of the retorts a row of openings S, S', S², and S³, situated one above the other, each of these openings having lids $s^3$ by which they can be tightly closed and each being formed as shown—to wit., with a broad flaring mouth $s$, a narrow neck $s'$, and a flaring end $s^2$ on the other side of neck—this construction enabling a poker to be freely moved through the thick wall of the structure A without necessitating a large opening therein.

Figure 1:
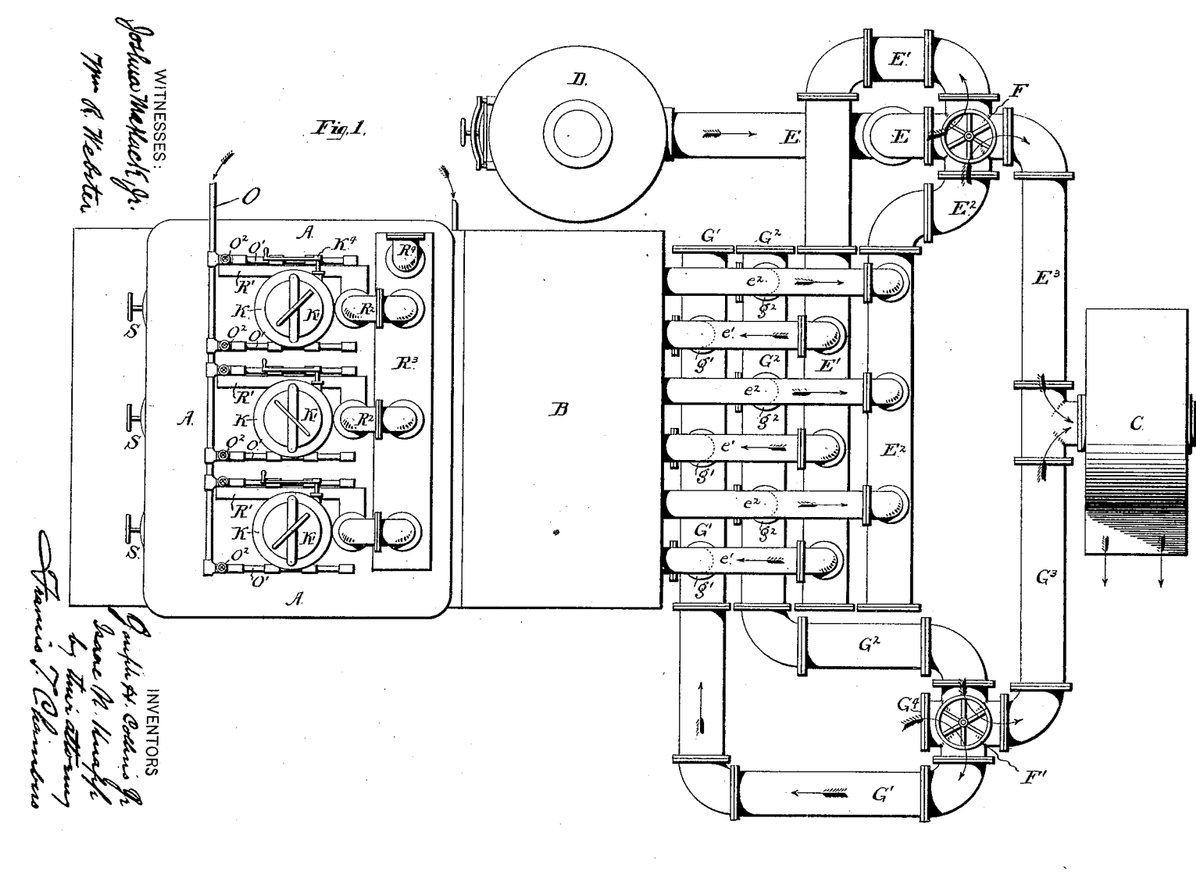
Figure 1 is a plan view of our apparatus.
Figure 2:
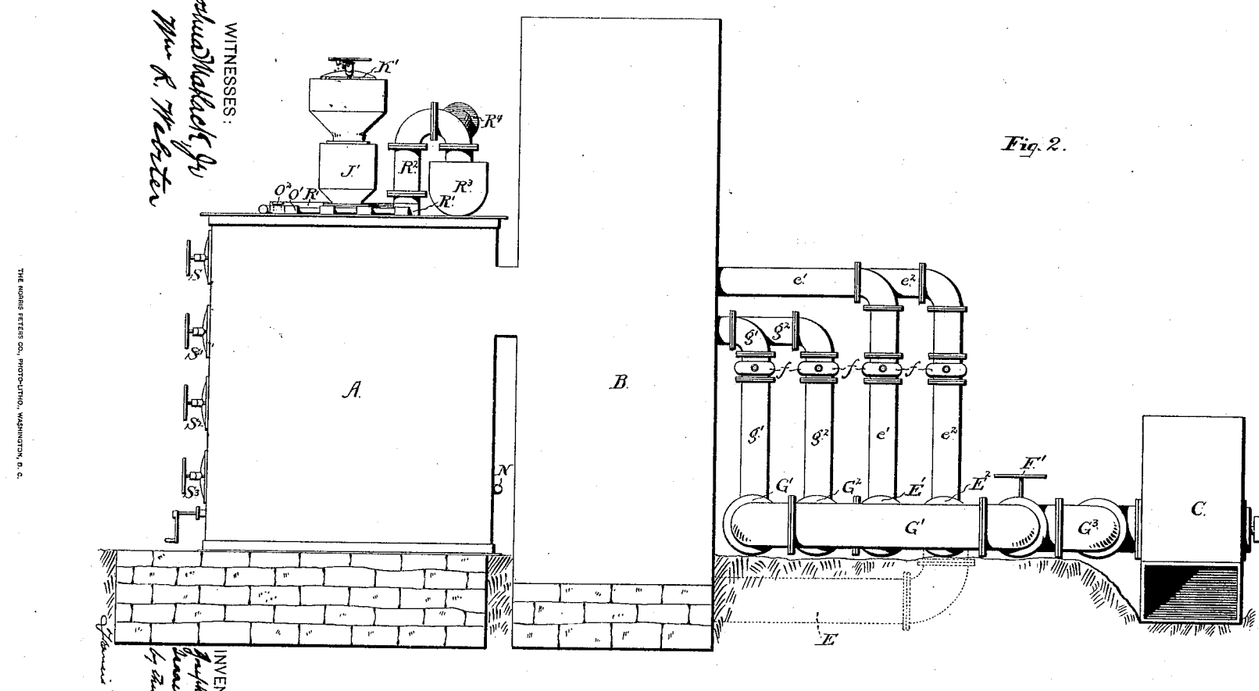
Fig. 2, a side elevation thereof.
Figures 3, 9:
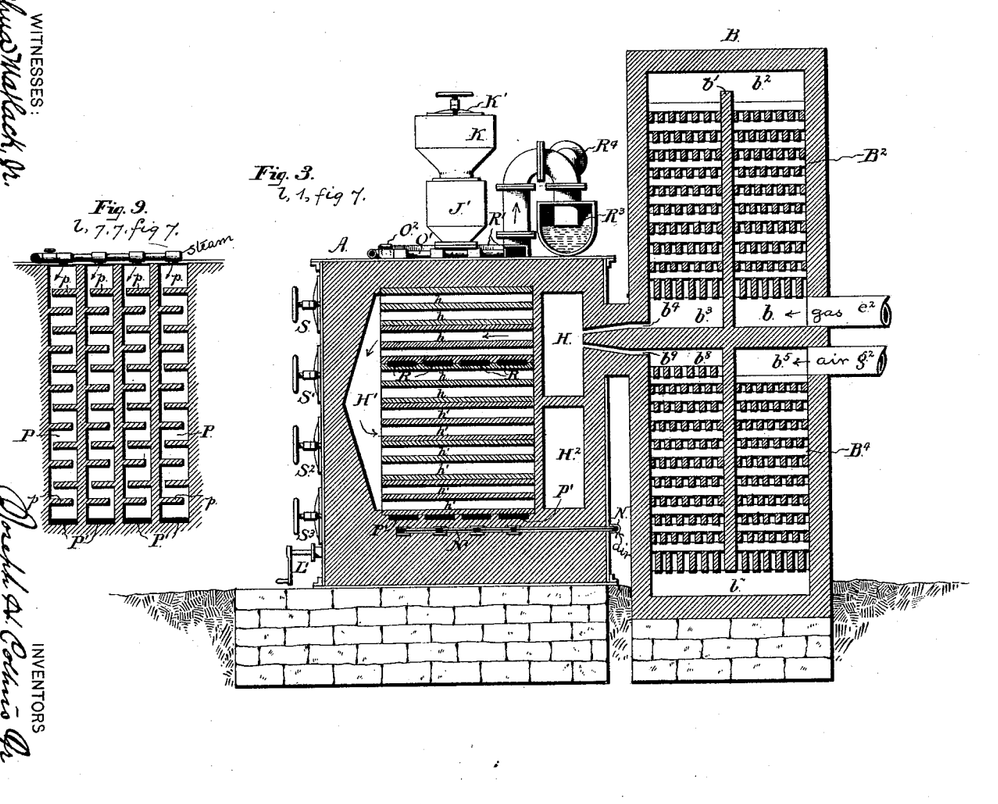

The mode of operating our furnace is as follows: The producer D is put in operative condition by filling it to the proper extent with fuel and igniting the same. The four-way cocks F and F' are then arranged, for instance, so as to connect the various conduits leading to them, as indicated by the arrows in the drawings, Fig. 1, and the exhaust-fan C is set in operation. The effect of this is to draw the producer gas through the pipe E into the pipe E', whence it passes through the three pipes $e'\,e'\,e'$ into the regenerative passages B', after traversing which it issues through passages $b^4$ into the chambers H⁴. The action of the blower also causes air to enter through the opening G⁴ and pass into pipe G', thence into the three pipes $g'\,g'\,g'$ into the regenerative passages B³, and thence through the passages $b^9$ to the chambers H⁴. The air and gas, being brought together in the chambers H⁴, are ignited by a torch or otherwise, and the burning gases and products of combustion pass first through the flues $h^3$ to the top of the triangular chambers $H^3$, and thence they pass through the flues $h^2$ to the chambers $H^2$. From chambers $H^2$ they pass through the flues $h'$ to the triangularly-shaped chambers $H'$, and thence through the flues $h$ to the chambers H. From the chambers H the products of combustion are drawn by the fan C through the passages $b^4$ and $b^9$ into the regenerative passages $B^2$ and $B^4$, from which they pass through pipes $e^2$ and $g^2$ into pipes $E^2$ and $G^2$, and thence into pipes $E^3$ and $G^3$, from which they pass directly into the fan C and to the open air. From time to time the position of the valves F and F' is changed so as to exactly reverse the above-described course of the gases, with the result of drawing the air and gas through the regenerative passages which have been heated by the escaping products of combustion and of drawing the products of combustion through the regenerative passages, which have been cooled by the passage of the air and gas.

We have shown and referred to the chambers $H'$ and $H^3$ as triangular. This shape is not an essential matter, but is preferred by us, because by having the chamber broad in the center and narrow at top and bottom the gases issuing from one of the flue sets entering them will be forced to pass evenly into the other set of flues. The momentum of the gases will naturally tend to force them toward the opposite end of the chamber from which they enter, and the contraction of the chamber toward the end checks this momentum and results in each flue receiving about the same amount of the gases.

We have already pointed out that the flue system entirely surrounds the retort-chambers J, formed between adjacent rows of flue-tiles I, and the retorts are consequently heated to a very high degree by the heating system we have described. The retort-chambers J are kept nearly full of bituminous coal, which is introduced from time to time through the boxes K in the way already described. The great heat transmitted through the walls of the retort drives off the volatile gases from the coal and produces in the retorts a mass of intensely-hot coke, this mass being of course near the bottom of the retort, while at its top fresh coal is constantly being introduced. Steam is introduced through the pipes O O' into the steam-passages P, passing down through which in contact with the flue-tiles I it becomes highly superheated and in this state enters the bottom of the retorts at the points P'. Here it comes in contact with the hot coke, and passing up through such coke it is decomposed, the result being the formation of a mixture of carbonic oxide and hydrogen know as "water-gas" and the complete combustion of the coke, of which nothing is left except ash. The water-gas of course mixes with the coal-gas produced by the direct distillation of the coal in the upper part of the retorts, and the mixed gases are drawn off to a receiver. We prefer, as we have already said, to place the gas-exit passages from each retort at a point in the side of the retort two feet, or thereabout, below the level of the fuel therein. The effect of this is to cause the most volatile of the gases to pass downward through the mass of coal more highly heated than that from which they escape, so that by the time they reach the exit-passages R they are in a more fixed or permanent condition than they would otherwise be. They here meet the hot water-gas, and the mixture escapes upward through the passages R in contact with the hot flue-tiles I, thus receiving additional heat and becoming still more permanent by the time they escape through box R', pipe $R^2$, and hydraulic main $R^3$ to the receiver.

We consider that it will sometimes be advantageous to force air into the retort-chambers J, and for this purpose have provided the air-pipe N with nozzles N', leading into the bottom of the retorts. When air is forced through these nozzles into the retorts, an actual combustion will of course take place, with production of carbonic oxide and nitrogen, the well-known producer of Siemens gas, which will pass, together with the water-gas and coal-gas, into the receiver.

In operating our apparatus it is our intention to maintain a bed of ashes above the grate L and between it and the points P', where the steam enters the retort-chambers. From time to time the grate L is rotated, so as to prevent too great accummulation of ash and enable the coke and coal to settle down in the retorts. The ashes fall into the water-pit M, from which they can be drawn at will without interfering with the action of the retorts.

It will be noticed that the operation of our apparatus is continuous, the mixed gases being constantly produced in the retort-chambers, the heat of which is maintained at a proper point by means of the regenerative system shown. It is of course not essential that the regenerative apparatus used should be constructed in exact accordance with the designs illustrated in the drawings, for while our design is, we think, especially well adapted for use with the retort and heating system shown, it is obviously not essential to it, and any other regenerative system can be substituted in its place.

In an application filed by us May 5, 1888, and bearing the Serial No. 272,954, and in our Patent No. 463,139, dated November 17, 1891, we have shown and described a process and an apparatus for the continuous manufacture of gas, which in many respects closely resembles the apparatus forming the subject-matter of this application. The leading feature of the said former applications, however, so far as the gas-producing retorts proper are concerned, is the use of pulverized fuel, which is permitted to fall through the vertical retorts, the coal being first subjected to a distilling action in the upper part of the retorts, and then to decomposition with steam in the lower parts thereof.

Our present apparatus is designed for the use of solid or unpulverized fuel, and is kept completely or substantially full of fuel at all times.

Having now described our invention, what we claim as new, and desire to secure by Letters Patent, is—

1. In a gas-producing apparatus, the combination of an externally-heated retort made up of vertical side walls and end walls, the end walls being narrow with respect to the side walls, (whereby a narrow vertical retort having broad side walls separated by a narrow intervening space is formed,) means for externally heating the retort, a hopper-box at the top of said retort, provided with appliances whereby coal can be introduced into the retort without opening it to the air, a grate at the bottom of the retort to sustain the charge therein, one or more steam-pipes entering the retort a little above the grate, and an ash-pit situated below the grate and constructed so that the ashes can be removed without opening the retort to the air, said retort being provided with a gas-exit passage leading from its upper part, all substantially as and for the purpose specified.

2. In a gas-producing apparatus, the combination of an externally-heated retort made up of vertical side walls and end walls, the end walls being narrow with respect to the side walls, (whereby a narrow vertical retort having broad side walls separated by a narrow intervening space is formed,) means for externally heating the retort, a hopper-box at the top of said retort, provided with appliances whereby coal can be introduced into the retort without opening it to the air, a grate at the bottom of the retort to sustain the charge therein, openings in the furnace-wall arranged one above the other along the edge of the retort and constructed with flaring mouths and contracted neck, as shown, one or more steam-pipes entering the retort a little above the grate, and an ash-pit situated below the grate and constructed so that the ashes can be removed without opening the retort to the air, said retort provided with a gas-exit passage leading from its upper part, all substantially as and for the purpose specified.

3. In a gas-producing apparatus, the combination of an externally-heated retort made up of vertical side walls and end walls, the end walls being narrow with respect to the side walls, (whereby a narrow vertical retort having broad side walls separated by a narrow intervening space is formed,) means for externally heating the retort, a hopper-box at the top of said retort, provided with appliances whereby coal can be introduced into the retort without opening it to the air, a grate at the bottom of the retort to sustain the charge therein, one or more steam-pipes entering the retort a little above the grate, and an ash-pit situated below the grate and constructed so that the ashes can be removed without opening the retort to the air, said retort being provided with a gas-exit passage leading from its upper part at a point below the top of the charging-zone, and hence below the level of the fuel therein, all substantially as and for the purpose specified.

4. In a gas-producing apparatus, the combination of an externally-heated retort made up of vertical side walls and end walls, the end walls being narrow with respect to the side walls, (whereby a narrow vertical retort having broad side walls separated by a narrow intervenng space is formed,) means for externally heating the retort, a hopper-box at the top of said retort, provided with appliances whereby coal can be introduced into the retort without opening it to the air, a grate at the bottom of the retort to sustain the charge therein, one or more steam-pipes entering the retort a little above the grate, and a water-bottom arranged to serve as an ash-pit to the retort, and said retort being provided with a gas-exit passage leading from its upper part, all substantially as and for the purpose specified.

5. In a gas-producing apparatus, the combination of an externally-heated retort made up of vertical side walls and end walls, the end walls being narrow with respect to the side walls, (whereby a narrow vertical retort having broad side walls separated by a narrow intervening space is formed,) means for externally heating the retort, a hopper-box at the top of said retort, provided with appliances whereby coal can be introduced into the retort without opening it to the air, a grate at the bottom of the retort to sustain the charge therein, one or more steam-pipes entering the retort a little above the grate, air-blast pipes entering the retort near its bottom, and an ash-pit situated below the grate and constructed so that the ashes can be removed without opening the retort to the air, said retort being provided with a gas-exit passage leading from its upper part, all substantially as and for the purpose specified.

6. In a gas-producing apparatus, one or more retorts made up of vertical side walls and end walls, the end walls being narrow with respect to the side walls, (whereby narrow vertical retorts having broad side walls separated by a narrow intervening space are formed,) said walls being composed of hollow tiles united to form a combustion-flue system, means for supplying said hollow walls with products of combustion, a hopper-box secured to the top of each retort for introducing coal without opening the retort to the air, a grate at the bottom of the retort to support its charge, a closed ash-pit, said retorts being provided with a gas-exit passage leading from the upper part of the retort, and steam-passages formed alongside the hollow tiles from the top to near the bottom of the retort, where they enter the same, all substantially as and for the purpose specified.

7. In a gas-producing apparatus, an externally-heated retort made up of vertical side walls and end walls, the end walls being narrow with respect to the side walls, (whereby a narrow vertical retort having broad side walls separated by a narrow intervening space is formed,) said retort having a hopper-box at its upper end through which coal can be introduced without opening the retort to the air, a grate at its bottom to support its charge, a closed ash-pit, a steam-pipe for introducing steam, and a gas-exit passage, all substantially as specified, in combination with a system of combustion-flues formed in its side walls so as to form a continuous passage for burning gases extending over the whole of both sides of the retort, a gas-producer, a conduit or conduits leading from the producer to one end of the combustion-flue passage, an air inlet or inlets leading into the said passage at the same point as the gas-conduit, an exhaust-fan, and a conduit or conduits leading from the fan to the combustion-flue passage at the other end from that connected with the gas-producer.

8. In a gas-producing apparatus, one or more narrow vertical retorts J, in combination with one or more sets of air and gas mixing chambers H $H^4$, a system of flues leading from each chamber H to each chamber $H^4$ and arranged to traverse the sides of the retort and heat the same throughout, two independent regenerators leading into each of chambers H and $H^4$, a gas-producer D, a suction-fan C, four conduits connected by a four-way valve F, one leading to the producer D, one to fan C, and two E' and $E^2$ connecting with independent regenerators leading to chambers H and $H^4$, four additional conduits united by a four-way valve F', one leading to fan C, one to the open air, and two G' $G^2$ connecting with the other two independent regenerators leading, respectively, to chambers H and $H^4$, all substantially as shown and described, and so that the producer gases and air can by changing the position of cocks F F' be made to pass at will through the regenerators heated by the escaping products of their combustion, while said gases are caused to pass through the passages formerly traversed by the entering gas and air.

9. In a gas-producing apparatus, one or more narrow vertical retorts J, in combination with one or more sets of air and gas mixing chambers H $H^4$, a system of flues leading from each chamber H to each chamber $H^4$ and arranged to traverse the sides of the retort and heat the same throughout, independent regenerators $B^2$ $B^4$, situated one above the other, leading into each chamber H, similar independent regenerators B' $B^3$, situated one above the other and alongside of regenerators $B^2$ $B^4$, leading into each regenerator H, a gas-producer B, a suction-fan C, four conduits connected by a four-way valve F, one leading to the producer D, one to fan C, and two E' and $E^2$ connecting with independent regenerators leading to chambers H and $H^4$, four additional conduits united by a four-way valve F', one leading to fan C, one to the open air, and two G' $G^2$ connecting with the other two independent regenerators leading, respectively, to chambers H and $H^4$, substantially as shown and described, and so that the producer gases and air can by changing the position of cocks F F' be made to pass at will through the regenerators heated by the escaping products of their combustion, while said gases are caused to pass through the regenerators formerly traversed by the entering gas and air.

JOS. H. COLLINS, JR.
ISAAC N. KNAPP.

Witnesses to the signature of Joseph H. Collins, Jr.:
FRANK A. MULLIKIN,
FRANCIS T. CHAMBERS.

Witnesses to the signature of Isaac N. Knapp:
WM. G. TOWNLEY,
ALBERT A. WILCOX.